L. Bronson,
Tool Centerer,
N°. 51,133. Patented Nov. 28, 1865.
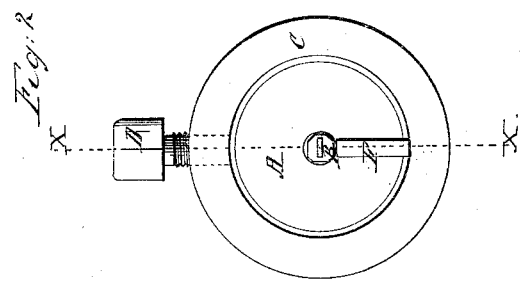
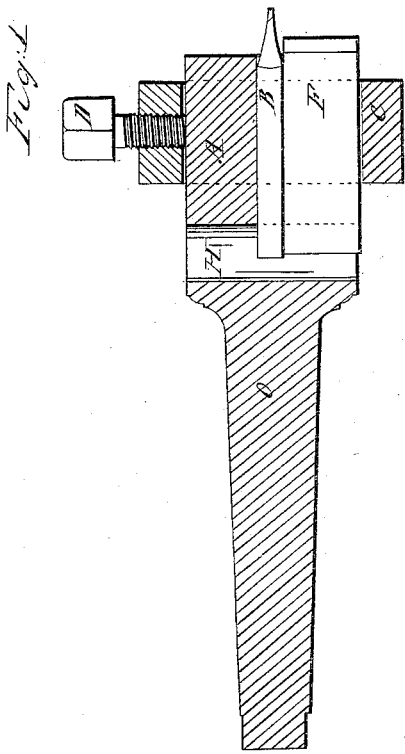
Witnesses.
Albert Krauss
H. A. Hotchkiss
Inventor.
Levi Bronson

UNITED STATES PATENT OFFICE.

LEVI BRONSON, OF BUFFALO, NEW YORK.

IMPROVED TOOL FOR SQUARING THE ENDS OF SHAFTING.

Specification forming part of Letters Patent No. 51,133, dated November 28, 1865.

*To all whom it may concern:*

Be it known that I, LEVI BRONSON, of the city of Buffalo, county of Erie, and State of New York, have invented a new and Improved Device for Centering and Squaring the Ends of Shafting; and I do hereby declare that the following is a full, clear, and exact description of the construction and operation of the same, reference being had to the annexed drawings, and to the letters of reference marked thereon, in which—

Figure I is a longitudinal vertical section taken from the line X X. Fig. II is a plan view.

The nature of my invention consists in the combination of a drill and cutter with a device by which a valuable tool is provided by which the ends of shaft for machinery may be quickly and accurately squared and smoothed in the most perfect manner. In the various branches of manufacture where a specialty is made in constructing certain machines or implements where a large number of shafts of uniform dimensions are used, this device is of great value, saving a great amount of time and labor.

To enable others skilled in the art to make and use my invention, I will proceed to describe its construction and operation.

Letters of like name and kind refer to like parts in the drawings.

A represents the body of my improved device, which is constructed of iron or steel, with a shank, O, that is made to fit closely into the tail-block of a lathe.

A hole is bored in the center of the tool-stock A in a longitudinal direction, and extending to a transverse hole, H, for the purpose of receiving the drill B. There is also a slot cut either diagonally or longitudinally, uniting with the drill-seat, also extending to the transverse hole H. The object and purpose of this slot is to receive the cutter F, which projects a short distance in a diagonal or longitudinal direction from the face of the body of the tool. The inner edge of the cutter bears against the side of the drill-shank, and both the drill and cutter are secured firmly in their positions by means of a dog, C, which is made larger than the body of the tool, so that it may be allowed to slide freely over the cutter and body of the tool.

When the drill cutter and dog are brought to their proper positions they are secured firmly in their places by means of the screw-bolt D. When the drill or cutter needs repairs or it becomes necessary to change their positions, the operator slackens the screw-bolt D, at which time they may be readily removed.

The said cutter may be introduced to the body of the tool either diagonally or longitudinally.

The operation consists simply by the operator placing the shaft into the lathe and the center drill at the tail end at the center of the shaft, at which time the shaft is put in motion, and the operator turning up the mandrel in which the above-described tool is placed until the drill has sunk into the end of the shaft to the edge of the cutter, when it comes in contact with the end of the shaft, and by still turning up the mandrel by the turning or revolving of the shaft while the cutter is stationary the end of the shaft is centered and squared rapidly and in the most perfect manner.

Having thus described my invention, what I claim, and desire to secure by Letters Patent, is—

In combination with the tool-stock described, the dog C, cutter F, and drill B, all for the purposes substantially as herein set forth.

LEVI BRONSON.

Witnesses:
ALBERT KRAUSS,
H. A. HOTCHISS.